(No Model.) 2 Sheets—Sheet 1.

C. R. DAVIS.
CULTIVATOR.

No. 418,692. Patented Jan. 7, 1890.

Witnesses
A. M. Hood.
O. K. Hood.

Inventor
Calvin R. Davis.

By H. P. Hood.
Attorney (No Model.)

C. R. DAVIS.
CULTIVATOR.

No. 418,692.

2 Sheets—Sheet 2.

Patented Jan. 7, 1890.

*Fig. 3.*

Witnesses
A. M. Hood.
E. K. Hood.

Inventor
Calvin R. Davis.

By H. P. Hood.
Attorney

UNITED STATES PATENT OFFICE.

CALVIN R. DAVIS, OF INDIANAPOLIS, INDIANA, ASSIGNOR OF ONE-HALF TO LEMUEL F. KIMBERLIN, OF SAME PLACE.

CULTIVATOR.

SPECIFICATION forming part of Letters Patent No. 418,692, dated January 7, 1890.

Application filed July 31, 1889. Serial No. 319,264. (No model.)

*To all whom it may concern:*

Be it known that I, CALVIN R. DAVIS, a citizen of the United States, residing at Indianapolis, in the county of Marion and State of Indiana, have invented a new and useful Improvement in Cultivators, of which the following is a specification.

My invention relates to an improvement in the mechanism for lifting and supporting in a raised position the plows or shovels of a cultivator.

The objects of my improvement are to prevent side draft from the lifting-spring when the plow-beam is in working position and to hold the plow-beam firmly in a raised position, all as hereinafter fully described.

The accompanying drawings illustrate my invention.

Figure 2:
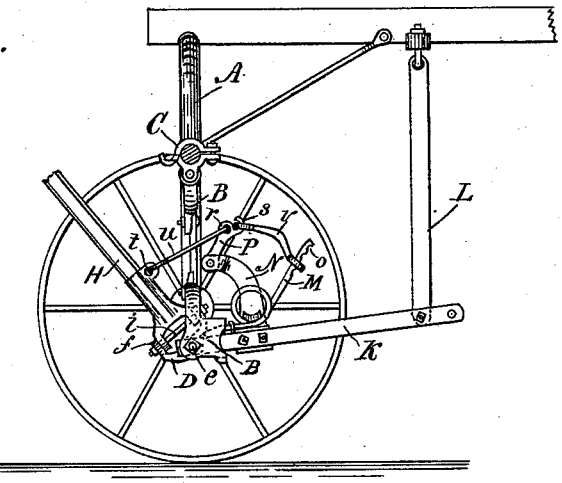
Figure 1:
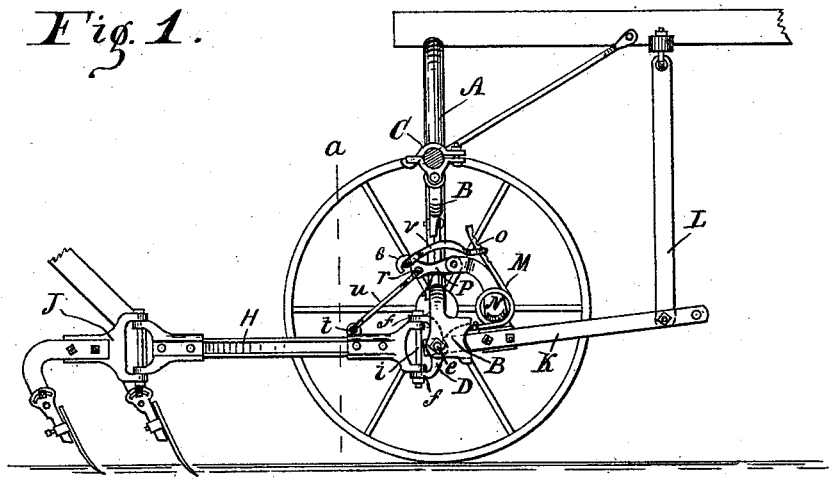

Figure 1 represents a side elevation of a two-horse straddle-row cultivator embodying my improvement, a part of the axle and one of the carrying-wheels having been removed and one of the plow-beams being shown in working position. Fig. 2 represents a like elevation showing the plow-beam raised. Fig. 3 represents a rear elevation as seen from *a*, Fig. 1.

The form of cultivator which I have here shown is that in which the plow-gangs are connected to a swinging frame suspended from the arched axle, and the lifting-spring is mounted on said swinging frame, so that the draft on the plow-gang is direct and the relation of the plow-beam to the lifting-spring is not changed by the draft, all of which is well known; but I wish it to be understood that the same arrangement of mechanism connecting the lifting-spring with the plow-beam may be also used in that form of cultivators in which the plow-beams and the lifting-springs are connected directly to the arched axle.

In the drawings, A is the arched axle, and B a swinging hanger suspended from the horizontal portion of the arch by a clip C.

D is the plow-beam coupling, which is pivoted at *e* to the lower end of the hanger B, so as to swing in a vertical plane thereon, and having jaws *f f*, which embrace the forward end of the plow-beam H, which is pivoted thereto so as to swing laterally thereon by a bolt *i*. The plow-beam here shown is of the well-known compound form, consisting of two beams or draft-bars, which are pivoted at one end to the coupling and at the other end to the shovel-head J.

K is the draft-coupling, which, with hanger B and link L, forms a swinging frame, on which the lifting-spring M is mounted.

The lifting-spring M consists of a coiled rod, which is secured to a bracket M, which is bolted to the draft-coupling. The free end of spring M extends upward and is provided with a series of notches *o*.

For the purpose of avoiding side draft of the lifting-spring when in tension and for holding the plow-beam firmly in a raised position, I pivot to an extension of the bracket N or to some other suitable support which bears a fixed relation to the lifting-spring one end of a swinging arm P, having at its free end an eye *r* and a hook *s*. Eye *r* of arm P is connected with an eye *t* on the plow-beam by a link *u*, and the arrangement is such that when the plow-beam is in working position arm P is extended backward and its eye *r* is directly over and in line with the pivot-bolt *i* on which the plow-beam swings laterally. The link *u* and the eye *r* thus become an extension of the hinge on which the beam swings laterally, and all side draft of the lifting-spring is avoided. Arm P is connected with the free end of spring M by means of a link *v*, which engages at one end the hook *s* of the arm and engages at the other end one of the series of notches *o* on the spring.

The arrangement of link *u*, the pivot which connects the arm to the bracket, the eye in the arm, the hook, the link *v*, and its connection with the spring is such that when the plow-beam is in working position eye *r*, the pivot, and the point of attachment of link *v* to the spring are nearly or quite in line, and the tension of the spring is then taken wholly by the arm. By slipping link *v* downward on the spring, so as to engage the lowest notch *o* thereon, the tension of the spring then operates to pull the free end of arm P downward, when the plow-beam is in working position, thus forcing the plows into the ground. By slipping the link *v* upward along the spring, so as to engage the upper notches, the effect will be to increase the lifting force on the plow-beam when in working position. As the plow-beam is lifted out of a working position arm P swings upward, and the effective lifting force of the spring is increased until the arm passes a vertical position. The arm is then inclined forward and comes to a stop against the throat of the forked end of bracket N, in which it is pivoted, as shown in Fig. 2. In this position the points of attachment of link u to the arm P and to the plow-beam are brought nearly in line with the pivot which connects the arm with bracket N, and a large portion of the downward pull of the plow-beam is diverted from the spring to the arm and its supporting-bracket, and the beam and its plows are thus held up firmly without jumping when the cultivator is moved from place to place.

I claim as my invention—

In a cultivator, the combination, with the plow-beam and its coupling, of the bracket N, secured to the coupling, spring M, mounted on the bracket, arm P, pivoted at one end to the bracket and having at its free end an eye r and hook s, pivot-bolt i, and links u and v, all arranged to co-operate in the manner and for the purpose specified.

CALVIN R. DAVIS.

Witnesses:
H. P. HOOD,
L. F. KIMBERLIN.